(12) United States Patent
Bell et al.

(10) Patent No.: US 8,602,066 B2
(45) Date of Patent: Dec. 10, 2013

(54) LOW PROFILE CONDUIT EXTENSION FOR DOWNSPOUTS

(75) Inventors: Robert B. Bell, Douglasville, GA (US); John J. McNichol, Holland, PA (US); Joseph K. Wolf, Lancaster, PA (US); J. Michael Connelly, Manheim, PA (US); Vincent Kehs, Barto, PA (US); Jeffrey C. Bowling, Cumming, GA (US)

(73) Assignee: Euramax International, Inc., Norcross, GA (US)

( * ) Notice: Subject to any disclaimer, the term of this patent is extended or adjusted under 35 U.S.C. 154(b) by 576 days.

(21) Appl. No.: 12/952,078

(22) Filed: Nov. 22, 2010

(65) Prior Publication Data
US 2012/0125465 A1    May 24, 2012

(51) Int. Cl.
*F16L 11/11*    (2006.01)

(52) U.S. Cl.
USPC .............. 138/118; 138/109; 138/121; 52/16; 285/903; 285/226

(58) Field of Classification Search
USPC .......... 138/121, 122, 109, 615; 405/119, 118; 52/11, 16; 239/508
See application file for complete search history.

(56) References Cited

U.S. PATENT DOCUMENTS

| | | | |
|---|---|---|---|
| 1,033,195 A | 7/1912 | Robinson | |
| 2,397,655 A | 4/1946 | Francis | |
| 2,814,529 A | 11/1957 | Arnt | |
| 3,861,419 A | 1/1975 | Johnson | |
| 3,911,954 A * | 10/1975 | Johnson | 137/615 |
| 5,358,007 A * | 10/1994 | Carlberg | 137/615 |
| 5,375,891 A * | 12/1994 | Sicotte et al. | 285/148.22 |
| 5,511,829 A * | 4/1996 | Sicotte et al. | 285/148.22 |
| 5,658,092 A | 8/1997 | Sweers | |
| 5,673,519 A * | 10/1997 | McCaughan | 52/16 |
| 5,735,085 A * | 4/1998 | Denooy | 52/16 |
| 5,813,701 A | 9/1998 | Noble | 285/4 |
| 5,862,632 A | 1/1999 | Zima | 52/16 |
| 6,041,825 A | 3/2000 | Smith | 138/109 |
| 6,202,358 B1 | 3/2001 | Janesky | 52/16 |
| 6,240,680 B1 * | 6/2001 | Estes | 52/16 |
| 7,017,614 B2 | 3/2006 | Handley | 138/109 |
| 7,458,532 B2 | 12/2008 | Sloan | 239/593 |
| 8,322,083 B1 * | 12/2012 | Kessler | 52/16 |
| 8,475,654 B1 * | 7/2013 | Smith | 210/162 |
| 2005/0160681 A1 * | 7/2005 | Boelling | 52/16 |
| 2007/0046021 A1 | 3/2007 | Crawford | |
| 2008/0023959 A1 * | 1/2008 | Crawford | 285/226 |

\* cited by examiner

*Primary Examiner* — Patrick F Brinson
(74) *Attorney, Agent, or Firm* — Kilpatrick Townsend & Stockton, LLP

(57) ABSTRACT

A low profile downspout extension is formed in multiple segments including a flexible conduit component, a splash block component and an extension component. An adapter is selectively connectable to the inlet portion of the flexible conduit component to allow mounting to a small downspout. The splash block component transitions from a circular inlet into a low profile rectangular configuration with an internal weir that prevents a back-flow of water into the circular portion. The low profile rectangular sections are formed with ribbed side walls and a crowned top surface to provide strength without requiring reinforcement. The flexible conduit portion includes a rectangular inlet, a circular outlet and a corrugated central portion that allows the selective orientation of the inlet relative to the outlet. The adapter includes a deflectable attachment tab that locks into an attachment rib on the inlet portion of the flexible conduit component.

21 Claims, 9 Drawing Sheets

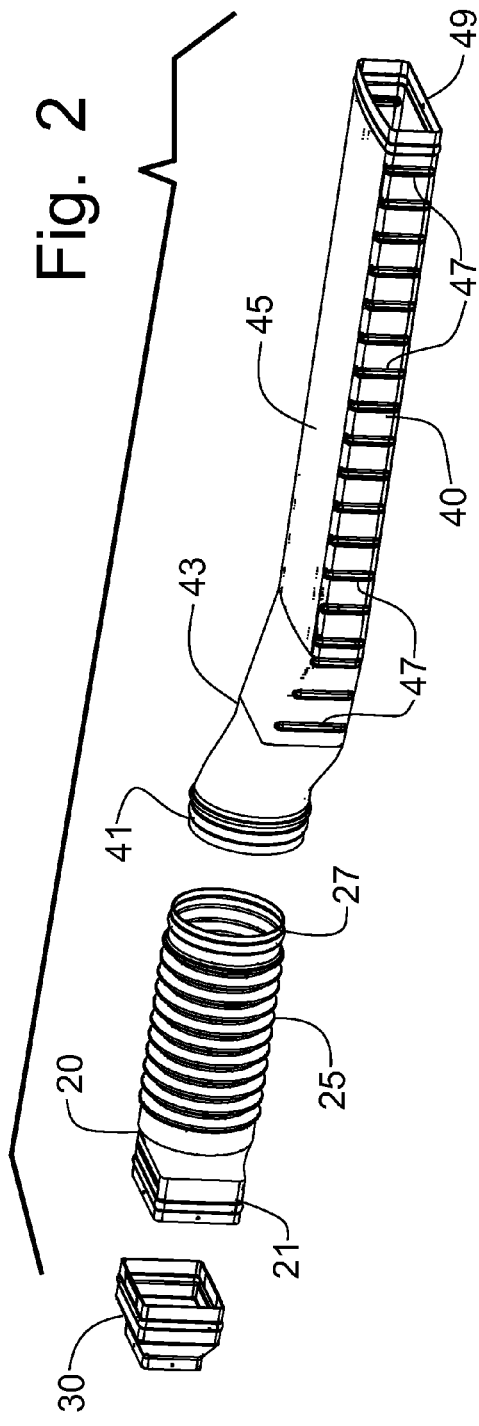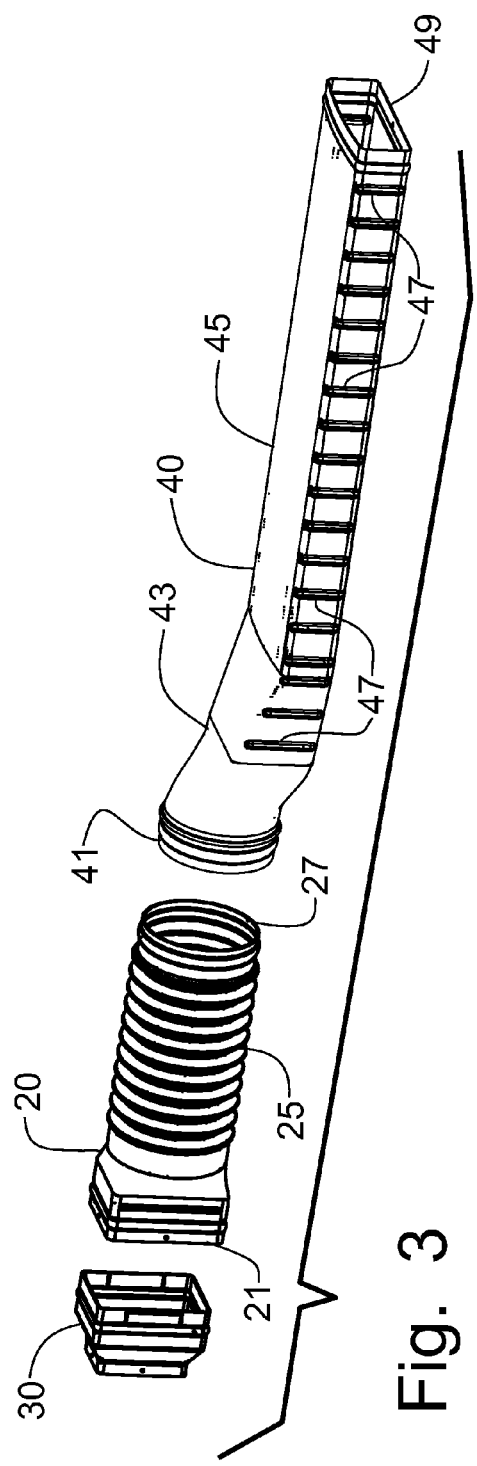

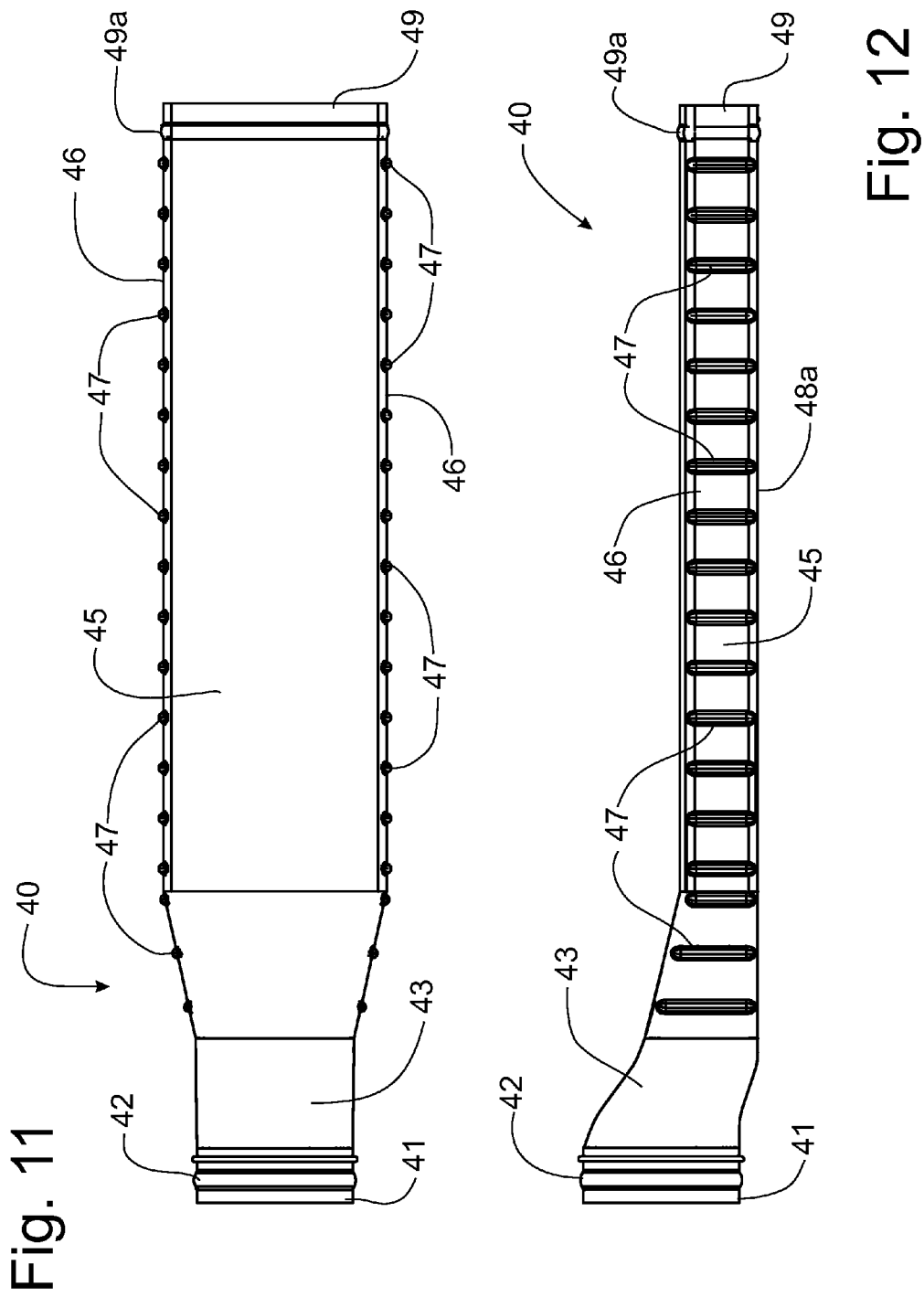

LOW PROFILE CONDUIT EXTENSION FOR DOWNSPOUTS

FIELD OF THE INVENTION

This invention relates generally to an apparatus for conveying rainwater away from a downspout and, more particularly, to a downspout extension that connects to different downspout sizes and incorporates a low profile configuration to move water underneath landscaping to a remote discharge location.

BACKGROUND OF THE INVENTION

Gutters and downspouts are mounted on most residential and commercial structures along the lower edge of the roof of the structure to receive water draining off of the roof, such as during a rainstorm. Gutters come in many different styles, including K gutter, half round gutter, or commercial box gutter, but all are generally formed with an open top through which water is received into a trough or channel that delivers the water by gravity to a downspout for discharge away from the building structure. Gutters are often mounted on a plurality of hangers that are spaced along the length of the gutter and fastened to fascia boards by nails or screws such that the gutter is suspended from the hangers. The downspout is connected to an outlet of the gutter to provide a conduit to drain the collected rainwater from the gutter for discharge along the surface of the ground and direct the rainwater away from the building structure.

Typically, the downspout is provided with an elbow at the discharge end thereof to direct the discharged rainwater into a generally horizontal direction away from the building on which the downspout is mounted. These elbows at the discharge end of the downspout have a short length and are only effective to provide a direction for the discharge of the rainwater away from the building; therefore, the rainwater is often discharged too close to the building and the discharged rainwater can find a way into the basement of the building to cause cracks or leaks. Splash blocks can be provided to receive the discharged rainwater from the downspout elbow and help direct the rainwater away from the building. Other attempts to divert the rainwater from downspouts include a non-flexible extension, which is typically a generally horizontally disposed piece of downspout affixed to the discharge end of the elbow, and a flexible downspout extension that can be bent in a desired direction to redirect the discharged rainwater.

Occasionally, a landowner will bury into the ground a drainage pipe or conduit for conveying rainwater to a remote location, such as a groundwater restoration cistern, or at least some point remotely distant from the building. The downspout is then connected to the drainage pipe by the downspout extension so that the rainwater is discharged at a location that will not infiltrate into the basement of the building. Once such downspout extension can be found in U.S. Pat. No. 5,813,701, granted to Christopher Noble on Sep. 29, 1998. The Noble downspout extension is formed with multiple adapter portions at each end of a flexible central portion. The adapter segments at the respective ends of the downspout extension are separated by a cut line to allow the installer of the downspout extension to separate the outwardmost adapter segment from the downspout extension so that the inner adapter segment could be utilized to connect to the downspout. The Noble downspout extension is formed so that the adapter segments at one end of the downspout extension will be capable of fitting into the corresponding adapter segment at the opposing end of the downspout extension so that multiple downspout extensions can be hooked together in a serial manner.

In U.S. Pat. No. 6,041,825, granted to Christopher Noble on Mar. 28, 2000, the downspout extension was formed with multiple adapter segments at each end of the flexible central portion of the downspout extension. More particularly, the adapter segments begin with a large rectangular configuration on the outwardmost ends of the downspout extension followed inwardly by a smaller rectangular adapter segment and then inwardly a smaller circular adapter segment. Each adapter segment is separable from the inwardly disposed adapter segment by a cut line so that the outward adapter segments can be removed. Accordingly, when the outwardmost adapter segment was utilized to connect to the discharge end of the downspout, the rainwater, and any debris entrained within the flow of the rainwater had to pass from a larger adapter configuration into a smaller adapter configuration, thus forming a restriction on the flow through the downspout extension.

A differently configured flexible downspout extension is disclosed in U.S. Pat. No. 7,017,614 granted on Mar. 28, 2006, to Stephen Handley. In the Handley downspout extension, one end of the downspout extension was formed with multiple rectangular adapter segments arranged in decreasing sizes from the outwardmost adapter segment to the innermost adapter segment, while the opposing end of the downspout extension was provided with circular connector sized for attachment to a circular drainage pipe or conduit. Thus, one end of the flexible downspout extension is formed for connection to a downspout, while the opposing end is formed for connection to a drainage pipe. As with the Noble downspout extensions, the connection of the downspout to the outwardmost adapter segment causes the flow to be constricted through decreasingly smaller adapter segments before reaching the central flexible portion.

Low profile downspout extensions are known from U.S. Pat. No. 5,862,632, granted to Eric M. Zima on Jan. 26, 1999, in which a telescopic extension is coupled to the discharge end of the downspout to direct water therefrom to a remote location. The rain chute disclosed in U.S. Pat. No. 6,202,358, issued on Mar. 20, 2001, to Lawrence M. Janesky, also provides a low profile apparatus for conveying water to a remote location from the downspout of a building. A low profile conduit connectable to a downspout discharge is disclosed in U.S. Pat. No. 7,458,532, granted on Dec. 2, 2008, to W. Haynes Sloan. The structure of this low profile conduit requires a reinforcement member at the transition area between the circular connector and the low profile rectangular conduit.

It would be desirable to provide a low profile downspout extension that is configured to connect to either 2×3 or 3×4 rectangular downspouts and transition into a low profile rectangular conduit that can be located below landscaping without providing reinforcement members. It would further be desirable to provide a low profile downspout extension that is extendable incrementally to provide a conduit of desirable length.

SUMMARY OF THE INVENTION

It is an object of this invention to overcome the disadvantages of the prior art by providing a low profile downspout extension that is connectable to different downspout sizes and transitions into a low profile rectangular conduit.

It is another object of this invention to provide a low profile downspout extension that multiple component parts that couple together to convey rainwater from a downspout to a remote location.

It is a feature of this invention that the low profile rectangular portions of the downspout extension is formed with vertically oriented side ribs to provide strength to the low profile rectangular portions.

It is another feature of this invention that the low profile rectangular connector segments are crowned on the top surface thereof to cooperate with the ribbed side walls to strengthen the rectangular connector segments.

It is an advantage of this invention that the ribbed side walls of the low profile rectangular connector segments provide a capability of telescoping an extension segment from the splash block segment.

It is another advantage of this invention that the length of the low profile conduit can be extended by adding additional segments.

It is still another feature of this invention that the splash block segment is formed with an internal weir in the transition portion to prevent a back-up of water from the rectangular segments into the circular portion of the splash block.

It is another advantage of this invention that water will not be trapped in the splash block.

It is still another object of this invention to provide an adapter that is detachably connectable to a flexible conduit component to allow a small downspout to be connected to a larger inlet opening of the flexible conduit component.

It is another advantage of this invention that the adapter transitions from a small opening to a larger opening in the flexible conduit component.

It is still another feature of this invention that the adapter is formed with attachment tabs that engage with an attachment rib formed in the inlet portion of the flexible conduit component.

It is yet another feature of this invention that the attachment tabs are inwardly deflectable to allow the passage of the attachment tabs into the inlet portion of the flexible conduit component.

It is a further feature of this invention that the flexible conduit component includes a central corrugated flexible portion that allows the inlet portion to be selectively oriented relative to the discharge portion.

It is yet another advantage that the flexible conduit component is formed with a rectangular inlet portion for connection to a downspout, a circular outlet portion for connection to the inlet end of the splash block component and a corrugated flexible central portion that is bendable to orient the inlet and outlet portions in a desired configuration.

It is still a further object of this invention to provide a low profile downspout extension that is connectable to the discharge end of a downspout to direct rainwater away from the building on which the downspout is mounted, which is durable in construction, inexpensive of manufacture, carefree of maintenance, facile in assemblage, and simple and effective in use.

These and other objects, features and advantages are accomplished according to the instant invention by providing a low profile downspout extension that is formed in multiple segments including a flexible conduit component, a splash block component and an extension component. An adapter is selectively connectable to the inlet portion of the flexible conduit component to allow mounting to a small downspout. The splash block component transitions from a circular inlet into a low profile rectangular configuration with an internal weir that prevents a back-flow of water into the circular portion. The low profile rectangular sections are formed with ribbed side walls and a crowned top surface to provide strength without requiring reinforcement. The flexible conduit portion includes a rectangular inlet, a circular outlet and a corrugated central portion that allows the selective orientation of the inlet relative to the outlet. The adapter includes a deflectable attachment tab that locks into an attachment rib on the inlet portion of the flexible conduit component.

BRIEF DESCRIPTION OF THE DRAWINGS

The advantages of this invention will become apparent upon consideration of the following detailed disclosure of the invention, especially when taken in conjunction with the accompanying drawings wherein:

FIG. 2 is an exploded perspective view of the primary components of the low profile downspout extension with the flexible conduit component being oriented in a first configuration;

FIG. 3 is an exploded perspective view of the primary components of the low profile downspout extension with the flexible conduit component being oriented in a second configuration;

FIG. 11 is a top plan view of the splash block component shown in FIG. 10;

FIG. 12 is a side elevational view of the splash block component shown in FIG. 10;

DETAILED DESCRIPTION OF THE PREFERRED EMBODIMENT

Figure 1:
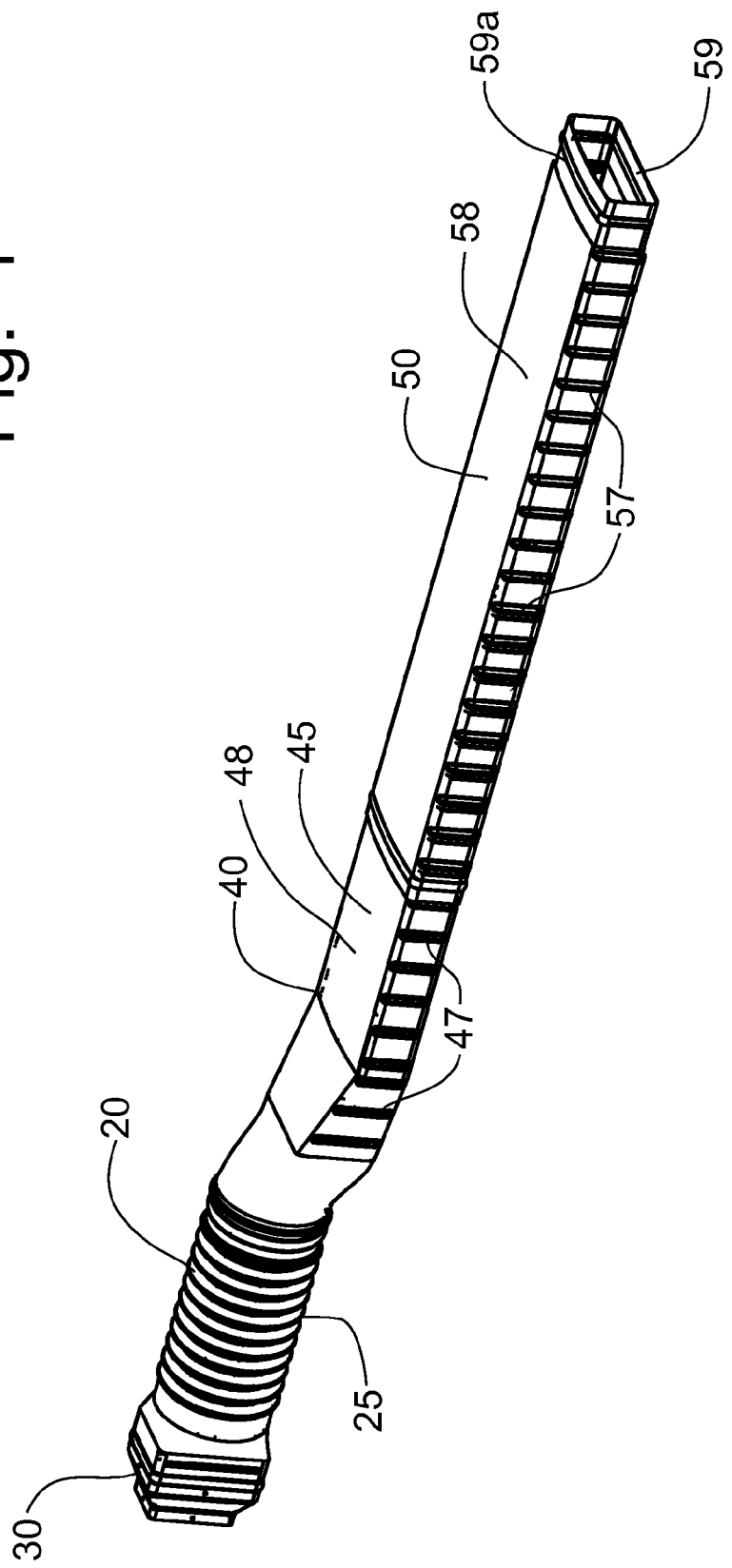
FIG. 1 is a perspective view of the assembled low profile downspout extension incorporating the principles of the instant invention, the adapter being mounted onto the flexible conduit component having the inlet and outlet portions aligned and the extension member being telescopically received on the splash block component.
Figure 4:
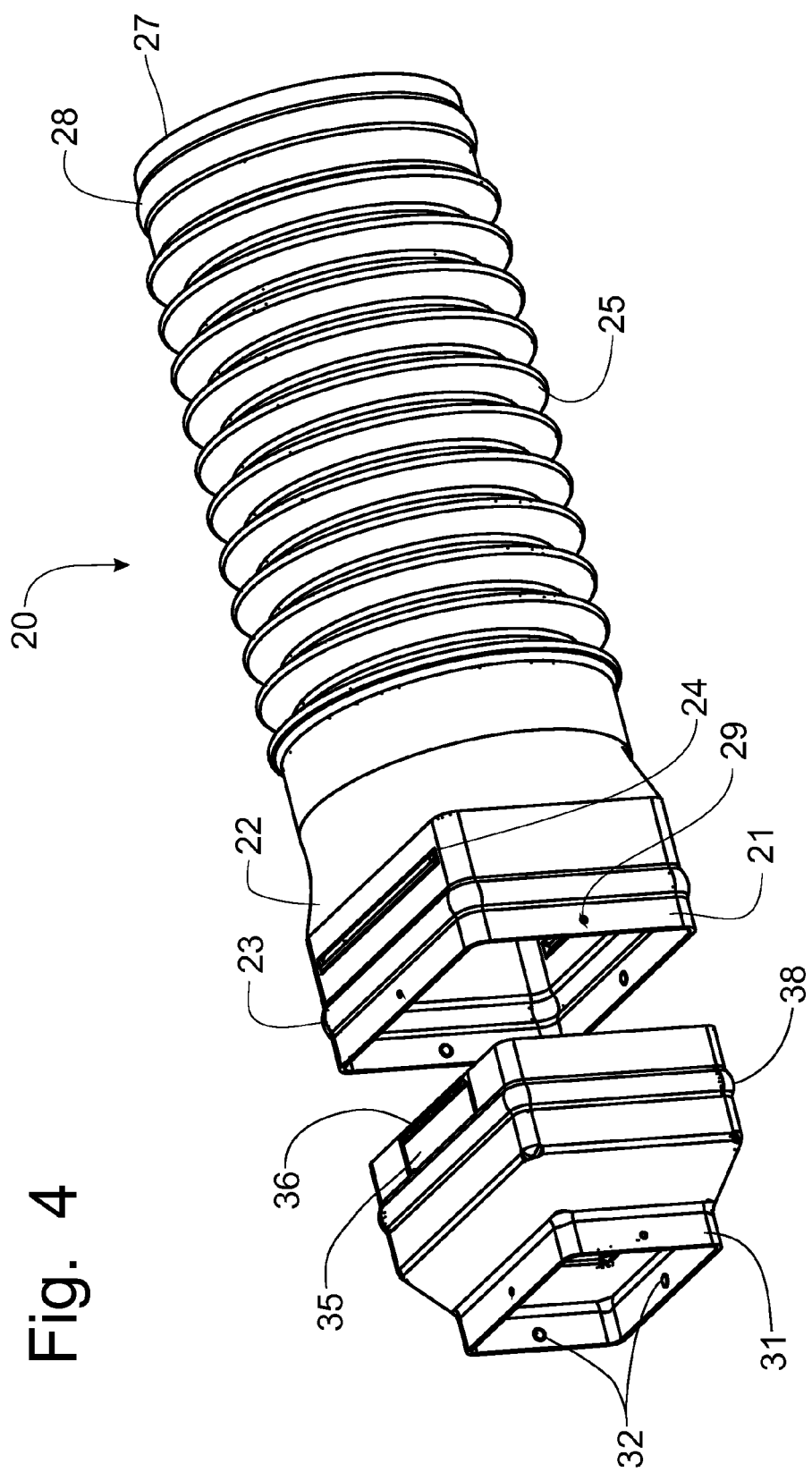
FIG. 4 is an enlarged exploded perspective view of the flexible conduit component and adapter.

Referring now to the drawings, a low profile downspout extension incorporating the principles of the instant invention can best be seen. The low profile downspout extension 10 is preferably formed from a hydrocarbon polymer, such as vinyl, polypropylene, PET and PVC, and includes separate components that can be assembled into a downspout extension of variable length depending on the utilization of extension components. As best seen in FIG. 1, the downspout extension 10 includes a flexible conduit component 20, an adapter 30 detachably connectable to the inlet end 21 of the flexible conduit component 20 to selectively change the size of the connection to the downspout (not shown), a fixed length splash block component 40 and one or more extension components 50 that can be connected to extend the length of the downspout extension as far as desired.

Referring now to FIGS. 2-6, the flexible conduit component 20 is formed with a rectangular inlet end 21, a circular outlet end 27 and a corrugated flexible portion 25 interconnecting the inlet and outlet ends 21, 27. The rectangular inlet end 21 is preferably sized to mount onto a three inch by four inch rectangular downspout outlet (not shown) and is provided with screw dimples or holes 29 to facilitate the utilization of screws to secure the inlet end 21 to the downspout. The flexible conduit component 20 also includes a transition portion 22 that converts the shape from rectangular to circular that mates with the central corrugated flexible portion 25, which is approximately four inches in diameter. The central flexible portion 25 is bendable in substantially any direction to allow the inlet end 21 to be oriented relative to the outlet end 27 as desired. The central flexible portion 25 terminates in the circular outlet end 27 that is formed with a connecting rib 28 projecting in a raised manner outwardly from the exterior surface of the outlet end 27.

Figure 5:
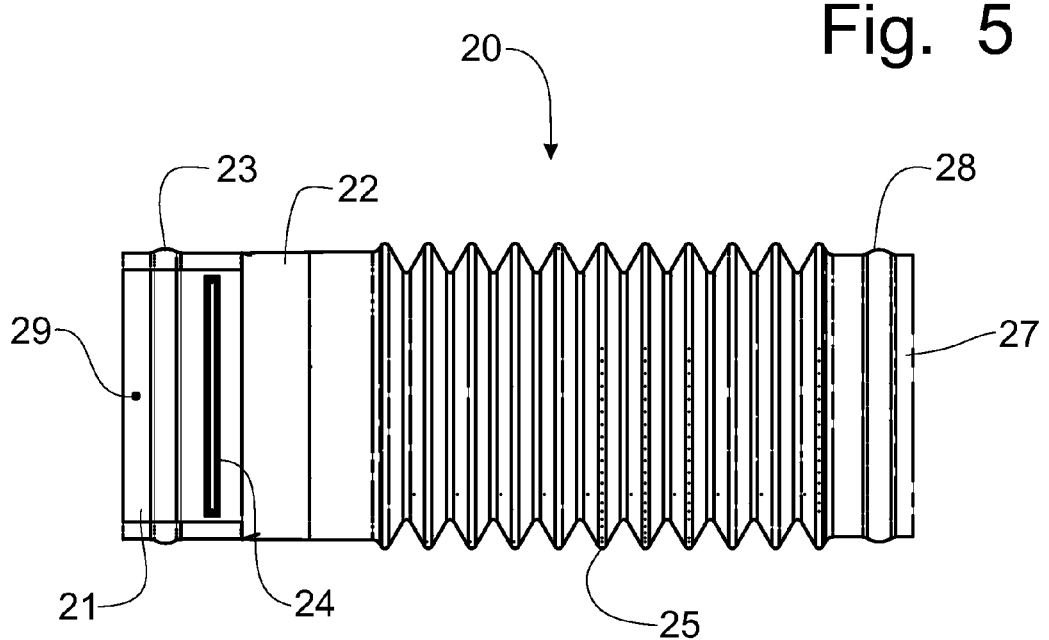
FIG. 5 is a top plan view of the flexible conduit component.
Figure 6:
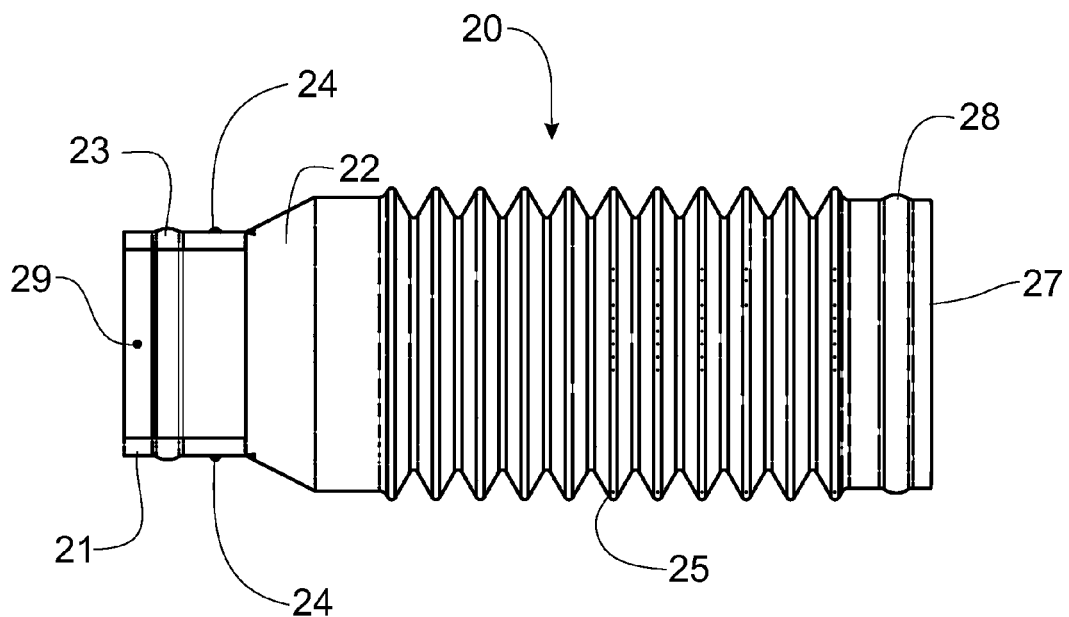
FIG. 6 is a side elevational view of the flexible conduit component shown in FIG. 5.

The inlet end 21 of the flexible conduit component 20 is also formed with a connecting rib 23 that extends around the perimeter of inlet end 21 and with an attachment rib 24 that is formed on the top and bottom surfaces of the inlet end 21, as is best seen in FIGS. 5 and 6. The flexibility of the corrugated central portion 25 allows the inlet end 21 to be oriented generally vertically for connection to a discharge end of a downspout (not shown) while the outlet end 27 is oriented generally horizontally to connect to the splash block component 40 that is positioned to divert water from the downspout underneath landscaping or other cover (not shown). One skilled in the art will readily understand that other selective configurations can be achieved with the ability to position the inlet end 21 as desired relative to the outlet end 27.

Figure 7:
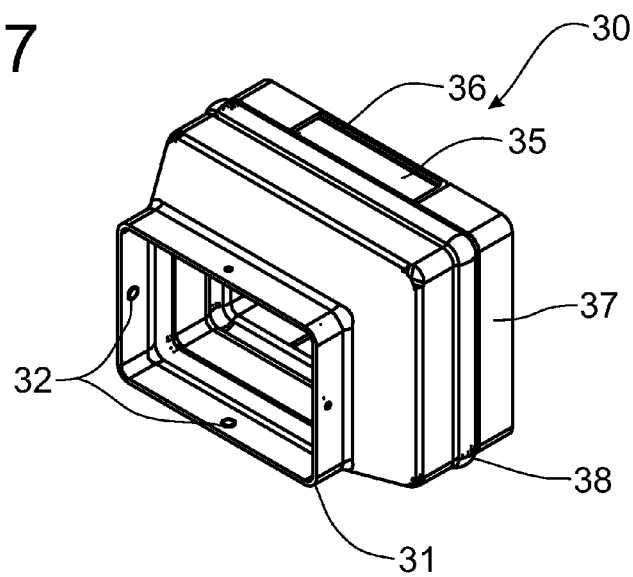
FIG. 7 is an enlarged perspective view of the adapter.
Figure 8:
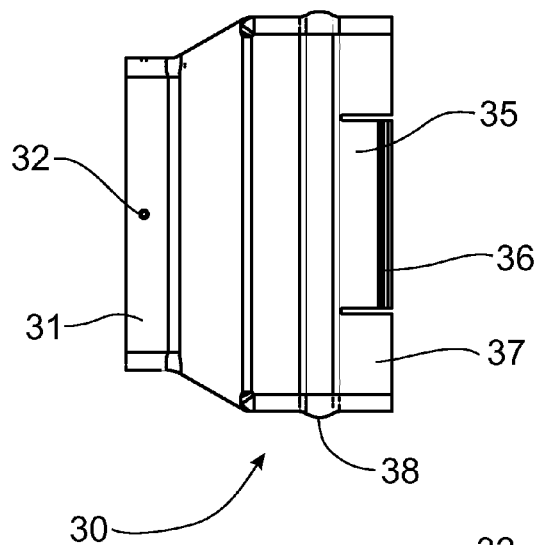
FIG. 8 is a top plan view of the adapter.
Figure 9:
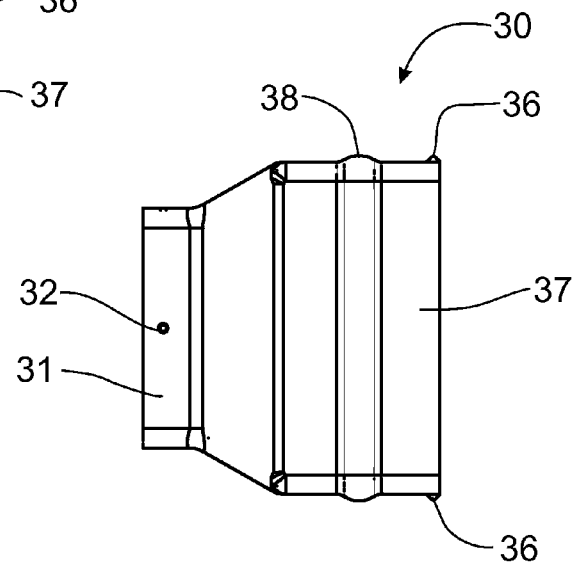
FIG. 9 is a side elevational view of the adapter.

The adapter 30 is best seen in FIGS. 7-9 and is formed with a rectangular inlet end 31 and a rectangular outlet end 37. The inlet end 31 is sized to fit over a two inch by three inch downspout discharge end. As with the inlet end 21 of the flexible conduit component 20, screw dimples or holes 32 are formed in each side of the perimeter of the inlet end 31 to allow the use of screws to fasten the adapter to the downspout (not shown). The outlet end 37 is sized to fit internally of the inlet end 21 of the flexible conduit component 20 and, thus, is substantially at a three inch by four inch rectangular size. The adapter 30 has a transition portion 34 that expands the shape of the adapter 30 from the smaller inlet end 31 to the larger outlet end.

The outlet end 37 is also provided with a connecting rib 38 extending around the perimeter of the outlet end 37 and positioned to engage within the connecting rib 23 when the outlet end 37 is positioned within the inlet end 21 of the flexible conduit component 20 to help retain the adapter within the flexible conduit component 20. The top and bottom surfaces of the outlet end 37 of the adapter 30 are also provided with a deflecting attachment tab 35 having a ridge 36 at the distal end thereof. The attachment tab 35 is operable to deflect inwardly because the ridge 36 pushes the attachment tab 35 inwardly as the adapter 30 is inserted into the inlet end 21 of the flexible conduit component 20. When the ridge 36 is aligned with the attachment rib 24 the attachment tab 35 springs outwardly to lock the ridge 36 into the attachment rib 24, locking the adapter 30 into the flexible conduit component 20.

The splash block component 40 is best seen in FIGS. 10-14. The inlet end 41 is formed in a circular configuration to mate with the outlet end 37 of the flexible conduit component 20. As with the adapter 30, the inlet end 41 is sized to receive the outlet end 27 of the flexible conduit component 20 and is formed with a connecting rib 42 that will be engaged by the connecting rib 28 of the outlet end 27 of the flexible conduit component 20 when inserted into the inlet end 41. The splash block component 40 has a body portion 45 that is generally rectangular in shape but with a low profile so that the height is much smaller than the width. The body portion 45 terminates in an outlet end 49 that includes a connecting rib 49a projecting outwardly thereof around the perimeter of the low profile rectangular outlet end 49. Between the circular inlet end 41 and the body portion 45, a transition portion 43 changes the circular shape of the inlet end 41 to the low profile rectangular body portion 45.

Figure 10:
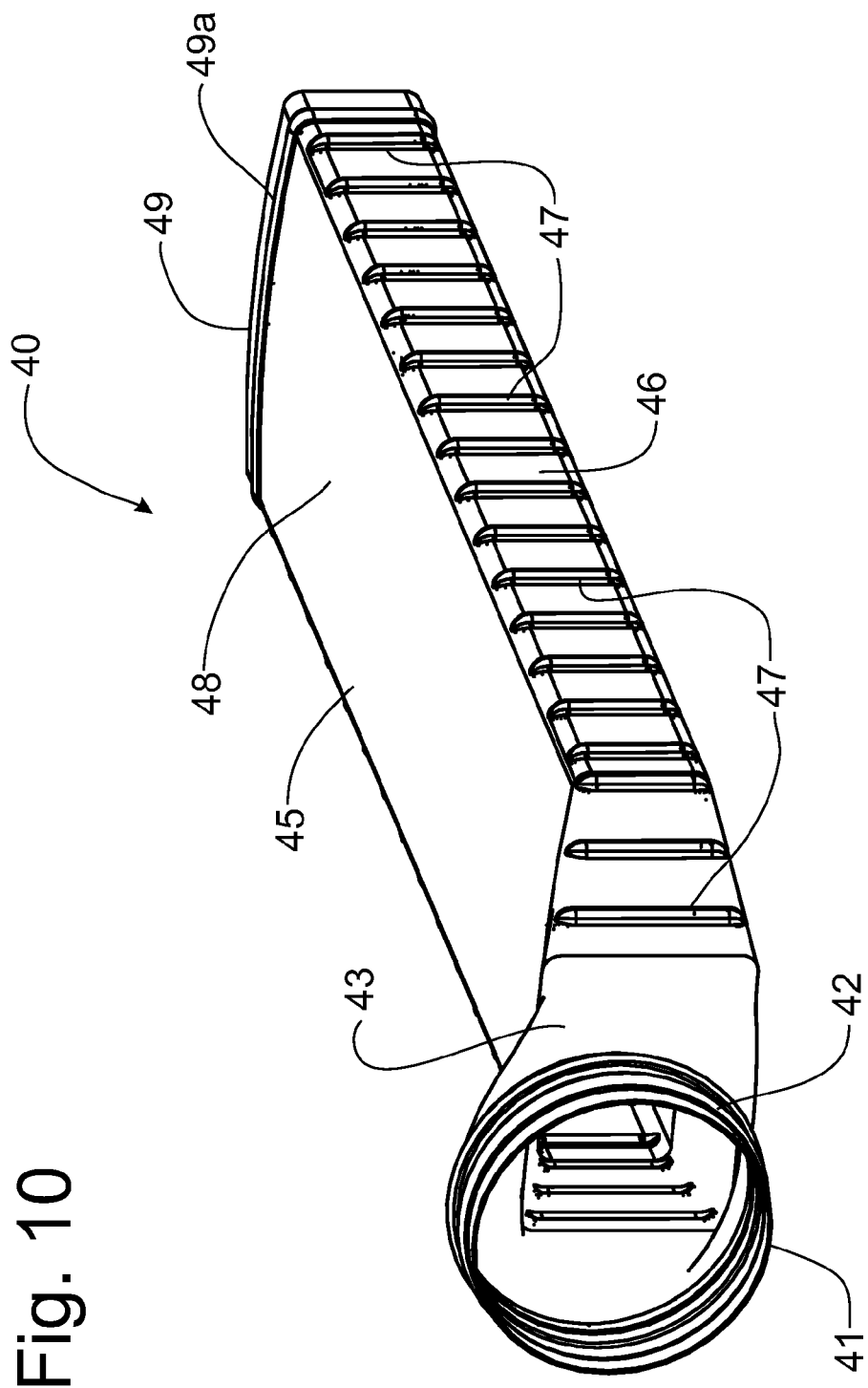
FIG. 10 is a perspective view of the splash block component looking into the circular inlet end thereof.
Figure 13:
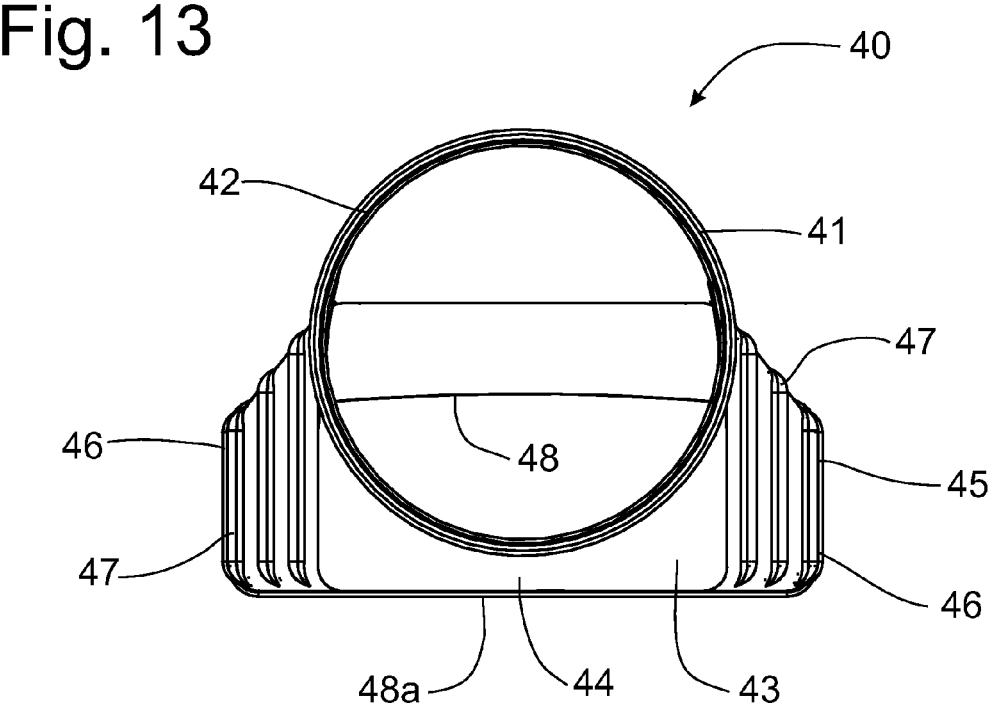
FIG. 13 is an enlarged inlet end view of the splash block component.
Figure 14:
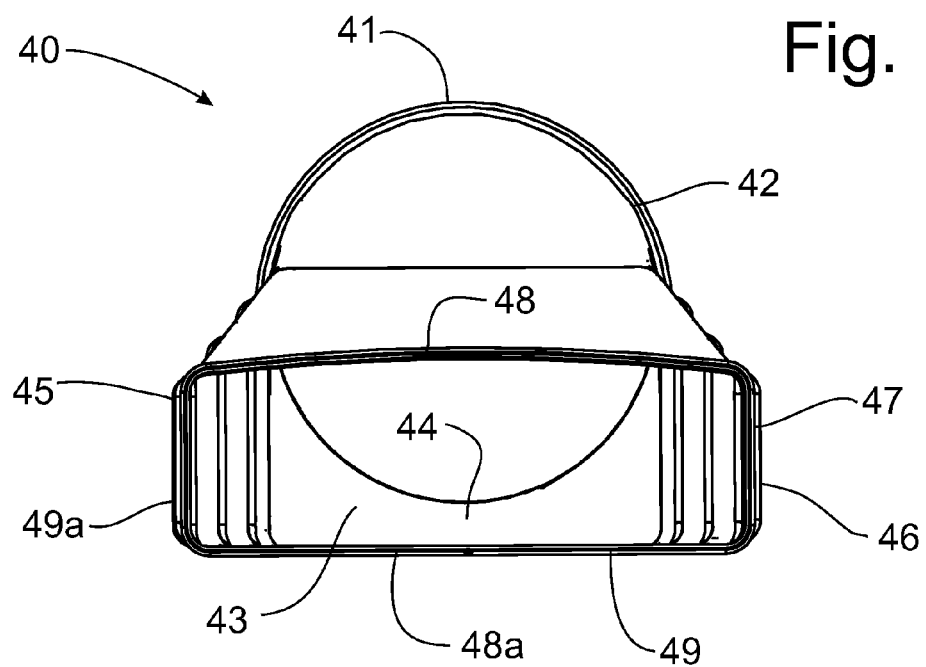
FIG. 14 is an enlarged outlet end view of the splash block component.
Figure 15:
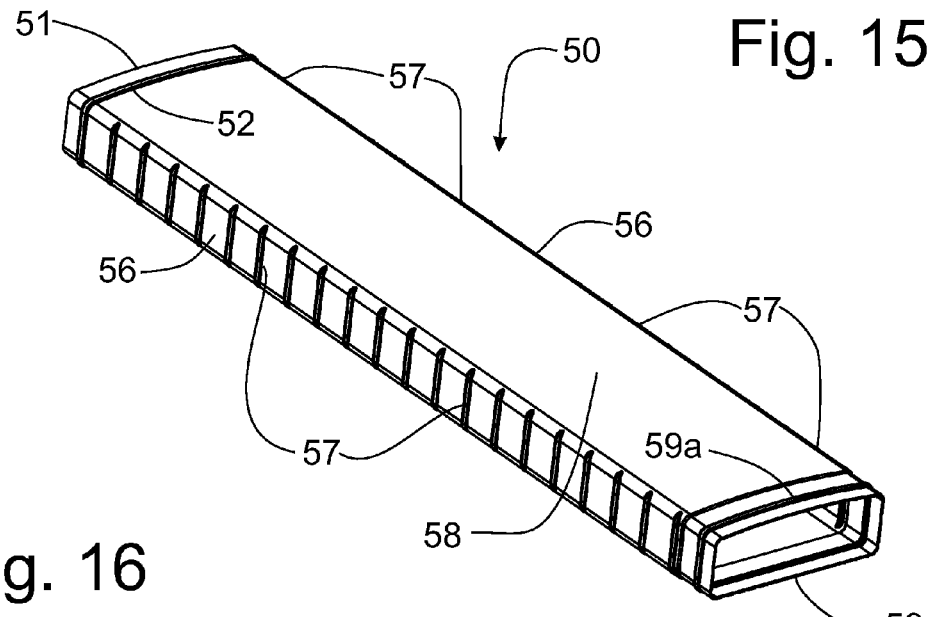
FIG. 15 is a perspective view of the extension component.
Figure 16:
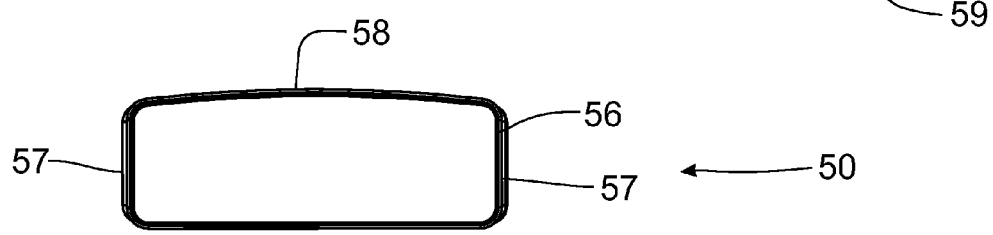
FIG. 16 is an end view of the extension component.
Figure 17:
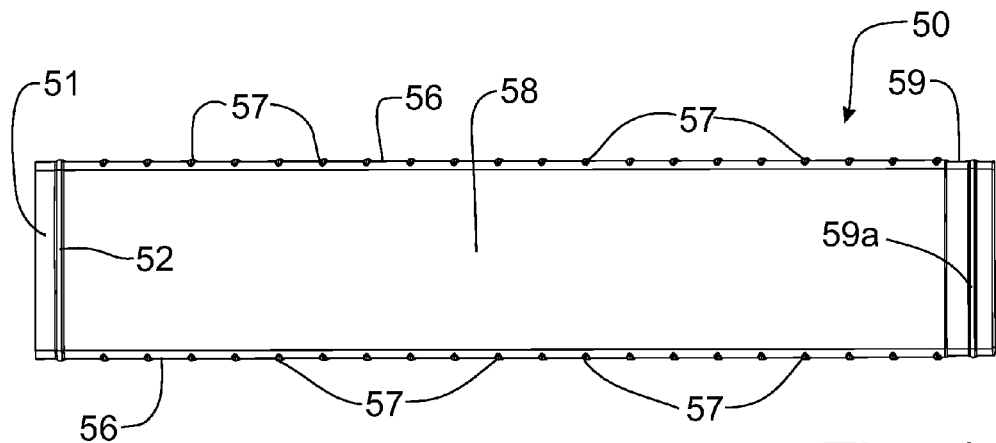
FIG. 17 is a top plan view of the extension component.

The body portion 45 is generally rectangular in shape and incorporates low-height side walls 46 having formed therein, along the longitudinal length of the body portion 45, a series of spaced apart reinforcing ribs 47. The reinforcing ribs 47 provide structural strength to the body portion 45 to resist collapse thereof when weight is placed on the top surface 48 between the side walls. To further strengthen the cross-section of the body portion 45, the top surface 48 is crowned, as best seen in FIGS. 10 and 14, preferably by the top surface being formed with an upwardly convex curve such that the longitudinal center of the top surface 48 is spaced further from the bottom surface 48a that at the side walls 46. This crowned top surface 48 further resists collapse of the body portion as the top surface 48 is slightly curved which transfer forces to the side walls 46 which are further strengthened by the reinforcing ribs 47. As best seen in FIGS. 11 and 12, a part of the transition portion 43 is also provided with reinforcing ribs 47.

The orientation of the inlet end 41 of the splash block 40 relative to the body portion 45, presents a weir 44 formed in the transition portion 43 to resist the back flow of water from the body portion 45 into, and possibly through, the inlet opening 41 to the flexible conduit component 20. Any such water that will back flow in such a manner due to the elevation of the body portion 45 being higher than the lower edge of the inlet opening 41 would collect within the system 10 and become stagnant and a breeding ground for insects. With the formation of the weir 44, the body portion 45 would have to be oriented at a completely inoperative position to allow a back flow of water into the inlet opening 41.

The last component of the flex conduit system 10 is the extension member 50. The extension member 50 is formed substantially identically to the body portion 45 of the splash block 40, except that the cross-section of the extension member 50 is slightly larger than the body portion 45, for reasons to be provided in greater detail below. The extension member 50 is of a generally rectangular shape with low profile side walls 56 formed with reinforcing ribs 57, and a crowned top surface 58. A connecting rib 52 is formed at the inlet end 51 to provide an annular engagement structure for mating with the connecting rib 49a on the outlet end 49 of the splash block 40. The outlet end 59 is also provided with a sealing bead 59a and has a slightly reduced cross-sectional size such that the outlet end 59 will fit within the inlet end 51 to facilitate the sequential coupling of multiple extension members 50 to form a low profile conduit 10 of substantial length.

As is best seen in FIG. 1, the extension member 50, having a slightly larger cross-section than the body portion 45 of the splash block 40, will fit over the distal outlet end 49 of the body portion 45 and slide over the body portion 45 in a telescopic manner toward the transition portion 43. The slightly larger cross-section of the extension member 50 allows the side wall reinforcing ribs 57 to slide over the reinforcing ribs 47 of the splash block 40 for engagement therewith to hold the extension member 50 in the desired location over the body portion 45 of the splash block 40. Furthermore, the connecting rib 52 on the inlet end 51 of the extension member 50 will also be operable to engage the reinforcing ribs 47 on the body portion 45 and help retain the extension member 50 at the desired location on the splash block 40. Accordingly, the user assembling the flex conduit system 10 can selectively position the extension member 50 on the splash block 40 and locate the outlet end 59 of the extension member 50 at the desired position relative to the inlet end 41 of the splash block member 40.

The maximum length of the assembly 10 shown in FIG. 1 is when the connecting rib 57 on the extension member 50 is engaged with the connecting rib 47 on the body portion 45. Since there are no additional reinforcing rib 57 to reinforcing rib 47 engagements at this maximum length position, the full perimeter engagement between the respective connecting ribs 49a, 52 is desirable to provide adequate retention of the extension member 50 on the outlet end 49 of the splash block member 40. The reduction in sizing of the outlet end 59 of the extension member 50 to fit internally of the inlet end 51 of a succeeding extension member 50 allows the end-to-end connection of subsequent extension members 50 to provide a conduit assembly 10 of substantially any desired length. The telescoping of the first extension member 50 on the body portion 45 of the splash block member 40 will provide a finite length adjustment equivalent to substantially on extension member 50 longitudinal length.

As is depicted in FIGS. 2 and 3, the flex conduit component 20, and the adapter 30 connected thereto, can be oriented in orthogonal configuration to provide a A/B option as a connecting elbow. The position shown in FIG. 2 is the most typical orientation, as this corresponds to most downspout constructions. Some downspouts (not shown) are oriented at ninety degrees to this typical orientation, and the flex conduit component can be turned ninety degrees about the connection of the outlet end 27 of the flex conduit component 20 to the inlet end 41 of the splash block component 40. The circular construction of the flexible corrugated central portion 25 does not change its perspective with respect to the surroundings.

It will be understood that changes in the details, materials, steps and arrangements of parts which have been described and illustrated to explain the nature of the invention will occur to and may be made by those skilled in the art upon a reading of this disclosure within the principles and scope of the invention. For example, the preferred material used to construct the components of the instant invention is a hydrocarbon polymer; however, one of ordinary skill in the art will recognize that other materials, such as other ferrous or non-ferrous materials, natural or synthetic rubber, fiber reinforced resin or a hybrid combination of such materials, could also be utilized to provide a flexible conduit system as described herein. The foregoing description illustrates the preferred embodiment of the invention; however, concepts, as based upon the description, may be employed in other embodiments without departing from the scope of the invention.

Having thus described the invention, what is claimed is:

1. A downspout extension for connection to a discharge end of a downspout mounted on a building structure, comprising:
   a flexible conduit component having an inlet end and an outlet end with a central flexible corrugated portion therebetween, the inlet end being connectable to said downspout;
   a splash block member having an inlet end and a body portion terminating in an outlet end, said body portion being formed with a low profile generally rectangular cross-sectional configuration having a bottom surface, a top surface and a pair of laterally spaced side walls interconnecting said top and bottom surfaces, each of said side walls including reinforcing ribs terminating at said top and bottom surfaces; and
   an extension member having a cross-section configuration mating with said body portion of said splash block to permit said extension member to be detachably connected to said outlet end of said splash block member, said cross-sectional configuration of said extension member defining a bottom surface, a top surface and laterally opposing side walls including reinforcing ribs terminating at said top and bottom surfaces of said extension member.

2. The downspout extension of claim 1 wherein said top surface is formed with a crown such that the longitudinal center of the top surface is spaced a distance from the bottom surface that is greater than a corresponding height of said side walls.

3. The downspout extension of claim 2 wherein said top surface is curved in an upwardly convex manner.

4. The downspout extension of claim 1 wherein said cross-sectional configuration of said extension member is greater than a corresponding mating cross-sectional configuration of said body portion so that said extension member can be mounted around said body portion in a telescopic manner.

5. The downspout extension of claim 4 wherein said reinforcing ribs on said side walls of said body portion engage internally the reinforcing ribs of said extension member to resist telescopic movement of said extension member over said body portion.

6. The downspout extension of claim 5 wherein said top surface of said extension member is crowned such that the longitudinal center of the top surface is spaced a distance from the bottom surface that is greater than a corresponding height of said side walls.

7. The downspout extension of claim 1 wherein said splash block is configured with a circular inlet end and a transition portion to change the circular shape of said inlet end to the generally rectangular shape of said body portion, said inlet end including an inlet opening having a lower edge that is located higher than the bottom surface of said body portion to define a weir between the body portion and the inlet end.

8. The downspout extension of claim 7 wherein said central flexible corrugated portion and said outlet end of said flexible conduit component have a circular configuration to mate with the inlet end of said splash block.

9. The downspout extension of claim 8 further comprising an adapter having an outlet end selectively connectable to said inlet end of said flexible conduit component, said adapter including an inlet end having an opening therein that is smaller than a corresponding opening in said inlet end of said flexible conduit component.

10. The downspout extension of claim 9 wherein said outlet end of said adapter is formed with an attachment tab on opposing surfaces thereof, said attachment tab including a ridge projecting outwardly from said attachment tab to engage said inlet end of said flexible conduit component and deflect said attachment tab inwardly, said inlet end of said flexible conduit component including an attachment rib positioned to receive each said ridge and secure said adapter to said flexible conduit component.

11. A downspout extension for connection to a discharge end of a downspout mounted on a building structure, comprising:

a flexible conduit component having an inlet end and an outlet end with a central flexible corrugated portion therebetween, the inlet end being connectable to said downspout;

a splash block member having an inlet end and a body portion terminating in an outlet end, said body portion being formed with a low profile generally rectangular cross-sectional configuration; and an extension member having a cross-section configuration mating with said body portion of said splash block and being slight larger than said body portion to permit said extension member to be telescopically mounted on said body portion of said splash block member, wherein each of said cross-sectional configuration of said body portion of said splash block and said cross-sectional configuration of said extension member includes a top surface, a bottom surface and laterally spaced side walls interconnecting said top and bottom surfaces, each of said side walls including a plurality of longitudinally spaced reinforcement ribs, the reinforcement ribs of said body portion engaging internally the reinforcement ribs of said extension member to provide resistance to said extension member telescopically moving over said body portion.

12. The downspout extension of claim 11 wherein said top surface on both said body portion and said extension member is formed with a crown such that the longitudinal center of the top surface is spaced a distance from the bottom surface that is greater than a corresponding height of the corresponding said side walls.

13. The downspout extension of claim 12 wherein each said top surface is curved in an upwardly convex manner.

14. The downspout extension of claim 13 wherein said splash block is configured with a circular inlet end and a transition portion to change the circular shape of said inlet end to the generally rectangular shape of said body portion, said inlet end including an inlet opening having a lower edge that is located higher than the bottom surface of said body portion to define a weir between the body portion and the inlet end.

15. The downspout extension of claim 14 further comprising an adapter having an outlet end selectively connectable to said inlet end of said flexible conduit component, said adapter including an inlet end having an opening therein that is smaller than a corresponding opening in said inlet end of said flexible conduit component.

16. The downspout extension of claim 15 wherein said outlet end of said adapter is formed with an attachment tab on opposing surfaces thereof, said attachment tab including a ridge projecting outwardly from said attachment tab to engage said inlet end of said flexible conduit component and deflect said attachment tab inwardly, said inlet end of said flexible conduit component including an attachment rib positioned to receive each said ridge and secure said adapter to said flexible conduit component.

17. A downspout extension for connection to a discharge end of a downspout mounted on a building structure, comprising:

a flexible conduit component having an inlet end and an outlet end with a central flexible corrugated portion therebetween, the inlet end being formed with an attachment rib in an upper surface of said inlet end and in an opposing lower surface of said inlet end;

an adapter having an inlet end smaller than said inlet end of said flexible conduit component and an outlet end formed with a first attachment tab on a top surface of said adapter and a second attachment tab on a bottom surface of said adapter outlet end, each said attachment tab including a ridge member at a distal end of said attachment tab engagable with a corresponding said attachment rib on said flexible conduit component when said adapter is inserted into the inlet end of said flexible conduit component;

a splash block member having an inlet end and a body portion terminating in an outlet end, said body portion being formed with a low profile generally rectangular cross-sectional configuration; and an extension member having a cross-section configuration mating with said body portion of said splash block and being slight larger than said body portion to permit said extension member to be telescopically mounted on said body portion of said splash block member.

18. The downspout extension of claim 17 wherein each of said cross-sectional configuration of said body portion of said splash block and said cross-sectional configuration of said extension member includes a top surface, a bottom surface and laterally spaced side walls interconnecting said top and bottom surfaces, each of said side walls including a plurality of longitudinally spaced reinforcement ribs, the reinforcement ribs of said body portion engaging internally the reinforcement ribs of said extension member to provide resistance to said extension member telescopically moving over said body portion.

19. The downspout extension of claim 18 wherein said top surface on both said body portion and said extension member is formed with an upwardly convex curved shape to define a crown such that the longitudinal center of the top surface is spaced a distance from the bottom surface that is greater than a corresponding height of the corresponding said side walls.

20. The downspout extension of claim 19 wherein said splash block is configured with a circular inlet end and a transition portion to change the circular shape of said inlet end to the generally rectangular shape of said body portion, said inlet end including an inlet opening having a lower edge that is located higher than the bottom surface of said body portion to define a weir between the body portion and the inlet end.

21. The downspout extension of claim 19 wherein each said extension member includes an outlet end that has a reduced cross-sectional size that will fit internally of an inlet end of a subsequent extension member to allow a sequential coupling of extension members.

\* \* \* \* \*